US012754657B2

(12) United States Patent
Chu et al.

(10) Patent No.: US 12,754,657 B2
(45) Date of Patent: Oct. 6, 2026

(54) SYSTEMS AND METHODS FOR GENERATING TEMPORARY IN-CONTEXT DATA

(71) Applicant: Strategy Inc, Tysons Corner, VA (US)

(72) Inventors: Keng-Fu Chu, Fairfax, VA (US); Amy Laresch, Washington, DC (US); Yung-Sheng Chen, Bethesda, MD (US); Zhili Cheng, Dunn Loring, VA (US); Alejandro Olvera Velasco, Falls Church, VA (US); Jaime Perez, Ashburn, VA (US)

(73) Assignee: Strategy Inc, Tysons Corner (VA)

( * ) Notice: Subject to any disclaimer, the term of this patent is extended or adjusted under 35 U.S.C. 154(b) by 0 days.

(21) Appl. No.: 17/806,860

(22) Filed: Jun. 14, 2022

(65) Prior Publication Data

US 2023/0400967 A1 Dec. 14, 2023

(51) Int. Cl.

| | |
|---|---|
| ***G06F 3/0481*** | (2022.01) |
| ***G06F 3/0482*** | (2013.01) |
| ***G06F 3/0484*** | (2022.01) |
| ***G06F 9/451*** | (2018.01) |
| ***G06N 3/082*** | (2023.01) |
| ***G06N 20/00*** | (2019.01) |

(52) U.S. Cl.

CPC .......... *G06F 3/0484* (2013.01); *G06F 3/0482* (2013.01); *G06F 9/452* (2018.02); *G06N 3/082* (2013.01); *G06N 20/00* (2019.01); *G06F 2203/04803* (2013.01); *G06F 2203/04804* (2013.01)

(58) Field of Classification Search

CPC ...... G06F 3/0484; G06F 3/0482; G06F 9/452; G06F 2203/04803; G06F 2203/048; G06F 3/0481; G06F 8/38; G06F 2203/04804; G06N 3/082

See application file for complete search history.

(56) References Cited

U.S. PATENT DOCUMENTS 11,860,922 B1 * 1/2024 Sojobi ................. G06F 16/9566
12,171,640 B2 * 12/2024 Fridman ............ A61B 1/00016

(Continued)

*Primary Examiner* — Xuyang Xia

(74) *Attorney, Agent, or Firm* — Bookoff McAndrews

(57) ABSTRACT

A method for providing dynamic in-context information is disclosed. The method may comprise: receiving a user input at a dossier; determining a contextual data point based on the user input; receiving a dossier-specific information window blueprint associated with the dossier, the dossier-specific information window blueprint comprising a layout for one or more dossier-specific information windows displayed via the dossier, wherein the dossier-specific information window blueprint is selected from a plurality of dossier-specific information window blueprints based on the user input and the contextual data point; receiving data from a database based on the dossier-specific information window blueprint; generating a dossier-specific information window based on the dossier-specific information window blueprint and the received data; and displaying the dossier-specific information window comprising the received data via a graphical user interface, wherein the dossier-specific information window occupies at least a subset area of the dossier.

19 Claims, 7 Drawing Sheets

100

(56) References Cited

U.S. PATENT DOCUMENTS

| | | | | |
|---|---|---|---|---|
| 2006/0095865 | A1* | 5/2006 | Rostom | G06F 3/0482 715/779 |
| 2009/0276771 | A1* | 11/2009 | Nickolov | G06Q 30/04 718/1 |
| 2010/0057684 | A1* | 3/2010 | Williamson | G06F 16/248 707/E17.014 |
| 2010/0083217 | A1* | 4/2010 | Dalal | G06F 16/9535 707/E17.108 |
| 2010/0122194 | A1* | 5/2010 | Rogers | G06F 3/0488 715/769 |
| 2012/0192075 | A1* | 7/2012 | Ebtekar | H04L 12/6418 709/224 |
| 2012/0194549 | A1* | 8/2012 | Osterhout | G06Q 30/02 345/633 |
| 2012/0254808 | A1* | 10/2012 | Gildfind | G06F 3/04886 715/863 |
| 2014/0282178 | A1* | 9/2014 | Borzello | G06F 9/453 715/771 |
| 2015/0106748 | A1* | 4/2015 | Monte | G06F 3/0485 715/753 |
| 2016/0077723 | A1* | 3/2016 | Pool | G06F 40/106 715/738 |
| 2016/0092081 | A1* | 3/2016 | Reichle | G06F 9/451 715/765 |
| 2019/0129588 | A1* | 5/2019 | Johnston | G06F 3/0482 |
| 2020/0034357 | A1* | 1/2020 | Panuganty | G06F 16/215 |
| 2020/0251111 | A1* | 8/2020 | Temkin | G10L 15/22 |
| 2021/0373760 | A1* | 12/2021 | Paul | G06F 3/04883 |
| 2023/0353652 | A1* | 11/2023 | Bi | H04L 67/55 |

* cited by examiner

410

SYSTEMS AND METHODS FOR GENERATING TEMPORARY IN-CONTEXT DATA

TECHNICAL FIELD

Various embodiments of the present disclosure relate generally to generating temporary in-context data, and more particularly to, systems and methods for displaying contextualized data using dossier specific information windows.

BACKGROUND

Data in a dossier is generally presented statically and with little allowance for user customization. Generally, when a user wants to see various data, an author must code for each data set independently and view the data based on the code or an algorithm that was previously generated. The user generally does not have the ability to view data in a preferable way and may not be able to interact with data dynamically. As such, data analysis, management, and tracking may be ineffective and/or inefficient.

Conventional techniques, including the foregoing, generally fail to present data in a preferable manner or analyze data dynamically, stifling data interpretation. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for generating and displaying contextualized data.

In one aspect, an exemplary embodiment of a method for providing dynamic in-context information may include: receiving a user input at a dossier; determining a contextual data point based on the user input; receiving a dossier-specific information window blueprint associated with the dossier, the dossier-specific information window blueprint comprising a layout for one or more dossier-specific information windows displayed via the dossier, wherein the dossier-specific information window blueprint is selected from a plurality of dossier-specific information window blueprints based on the user input and the contextual data point; receiving data from a database based on the dossier-specific information window blueprint; generating a dossier-specific information window based on the dossier-specific information window blueprint and the received data; and displaying the dossier-specific information window comprising the received data via a graphical user interface (GUI), wherein the dossier-specific information window occupies at least a subset area of the dossier.

In another aspect, an exemplary embodiment of a system for providing dynamic context information may include: at least one memory storing instructions; and at least one processor executing the instructions to perform a process, the processor configured to: receive a user input at a dossier; determine a contextual data point based on the user input; receive a dossier-specific information window blueprint associated with the dossier, the dossier-specific information window blueprint comprising a layout for one or more dossier-specific information windows displayed via the dossier, wherein the dossier-specific information window blueprint is selected from a plurality of dossier-specific information window blueprints based on the user input and the contextual data point; receive data from a database based on the dossier-specific information window blueprint; generate a dossier-specific information window based on the dossier-specific information window blueprint and the received data; and display the dossier-specific information window comprising the received data via a graphical user interface (GUI), wherein the dossier-specific information window occupies at least a subset area of the dossier.

In another aspect, an exemplary embodiment of a method for providing dynamic in-context information may include: receiving a first user input at a dossier; determining a first contextual data point based on the first user input; receiving a first dossier-specific information window blueprint associated with the dossier, the first dossier-specific information window blueprint comprising a first layout for a first dossier-specific information window displayed via the dossier, wherein the first dossier-specific information window blueprint is selected from a plurality of dossier-specific information window blueprints, based on the first user input and the first contextual data point; receiving first data from a database based on the first dossier-specific information window blueprint; generating the first dossier-specific information window based on the first dossier-specific information window blueprint and the first data; and displaying the first dossier-specific information window comprising the first data via a graphical user interface ("GUI"), wherein the first dossier-specific information window occupies at least a first subset area of the dossier; receiving a second user input at the dossier; determining a second contextual data point based on the second user input; receiving a second dossier-specific information window blueprint associated with the dossier, the second dossier-specific information window blueprint comprising a second layout for a second dossier-specific information window displayed via the dossier, wherein the second dossier-specific information window blueprint is selected from the plurality of dossier-specific information window blueprints based on the second user input and the second contextual data point; receiving second data from a database based on the second dossier-specific information window blueprint; generating a second dossier-specific information window based on the second dossier-specific information window blueprint and the second data; and displaying the second dossier-specific information window comprising the received data via the GUI, wherein the second dossier-specific information window occupies at least a second subset area of the dossier.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
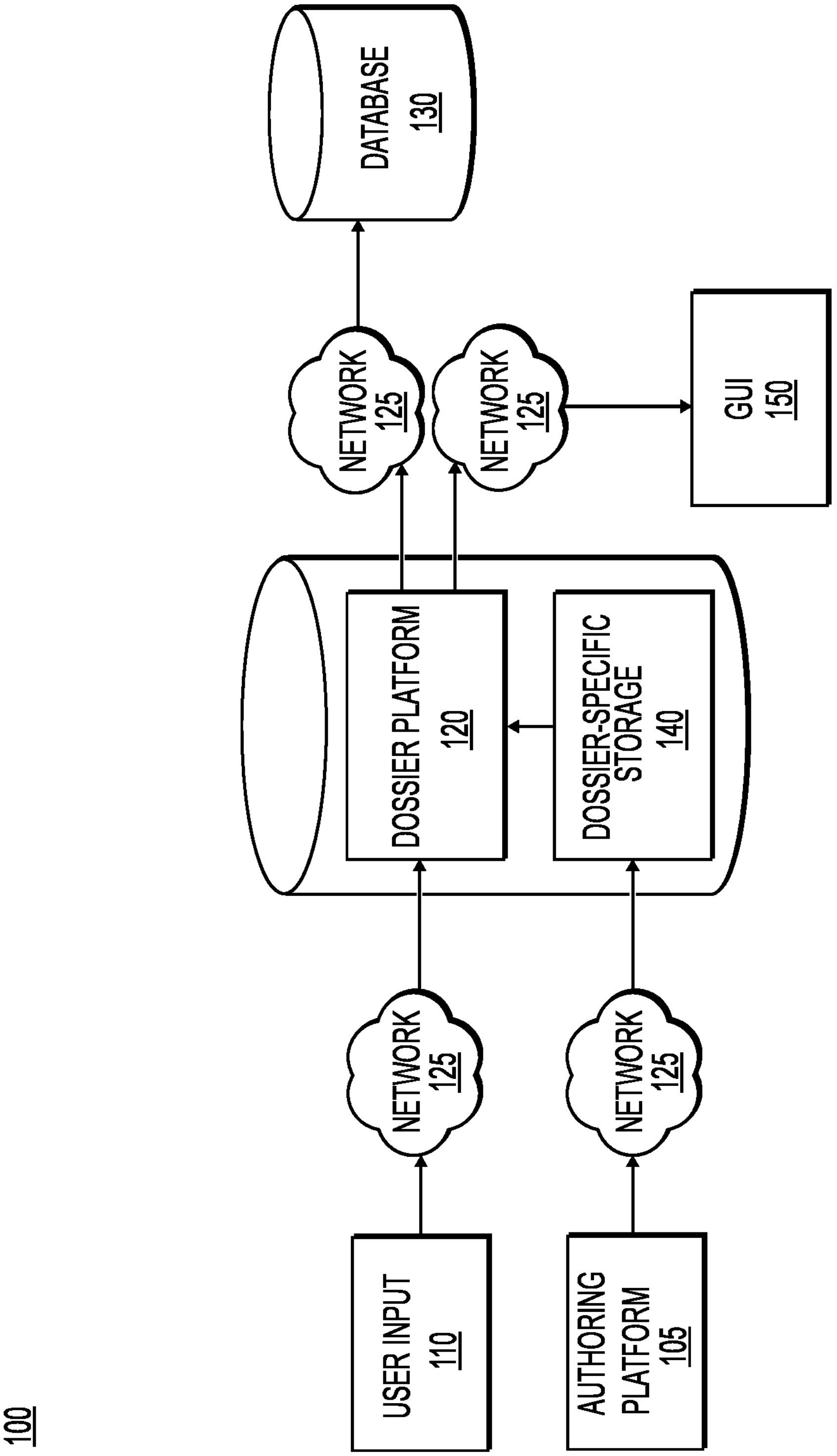
FIG. 1 depicts an exemplary environment for generating dossier-specific information windows, according to one or more embodiments.

Generally, users often find it difficult to monitor data changes over time. Accordingly, improvements in technology relating to generating contextualized data using dossier-specific information windows are needed.

According to certain aspects of the disclosure, methods and systems are disclosed for generating and displaying contextualized data using dossier-specific information windows. These methods and systems may improve data interpretation, tracking, and management for various users. The techniques disclosed herein allow authors to create free-form or preset designs, e.g., visualizations to optimally display contextualized data using dossier-specific information windows. The techniques disclosed herein also provide up-to-date data, improving the speed at which the user can interpret and understand data and data changes over time.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially", "approximately", or "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first user data could be termed a second user data, and, similarly, a second user data could be termed a first user data, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "author" or the like generally encompass an entity, person, or organization that generates blueprints or the like. For example, the "author" may be a human that designs various blueprints (e.g., a computer engineer) or a machine learning model that generates various blueprints based on user inputs. Terms like "user" generally encompass any person or entity that may use a dossier to consume information, provide information, resolution of an issue, purchase of a product, or engage in any other type of interaction with the blueprints generated by an author. Terms like "hover, "click," "focus," or the like refer to various forms of gesture recognition. These forms of gesture recognition may be initiated by the use of a computer mouse with a moveable cursor, one or more gestures, touchpad, input device, gaze, or any other suitable method for entering user inputs.

A graphical user interface (GUI), or the like, generally encompasses user interfaces that visually display information and may allow user interaction using electronic devices, graphical icons, and/or audio indicators. A dossier, or the like, generally encompass GUIs that present information from one or more databases to a user. A dossier may access databases in real time or near real time such that the dossier has access to changes in data. The dossier may be organized and/or designed based on an author's preference and may be specific to one or more databases associated with an entity (e.g., a company, organization, etc.). A dossier-specific information window, or the like, generally encompasses an interface or information windows that present information in a particular manner. Dossier-specific information windows may be customizable, as further disclosed herein. A dossier-specific information window may be presented over a portion of a dossier, may overlap with all or part of a dossier, may be semi-transparent or semi-opaque, or the like. As used herein, a template may include a premade format of layouts or placeholders that may include charts, graphs, and/or other methods of displaying data and/or information. A dossier-specific information window blueprint may be generated based on a template or a modified version of a template. A template may be generated, for example, based on historical dossier-specific information window blueprints. A dossier-specific information window blueprint may include a customizable set of charts, graphs, and/or other methods of displaying data and/or information. A dossier-specific information window blueprint may be customized based on an author, category, or any other relevant measure.

As used herein, a "machine learning model" generally encompasses instructions, data, and/or a model configured to receive input, and apply one or more of a weight, bias, classification, or analysis on the input to generate an output.

The output may include, for example, a classification of the input, an analysis based on the input, a design, process, prediction, or recommendation associated with the input, or any other suitable type of output. A machine learning model is generally trained using training data (e.g., historical user data, experiential data, and/or samples of input data), which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine ("GBM"), deep learning, and/or a deep neural network. Supervised, semi-supervised, and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

According to an example of the disclosed subject matter, a user and/or author may require viewing up-to-date data from one or more databases. Conventionally, a user and/or author may have to repeatedly request data updates from a server. Further, the data may not be displayed in a preferred way, such as in a way that displays the data most relevant to the user and/or author. Thus, it is desirable to improve the way data is presented and retrieved from databases, e.g., by implementing a dynamic data presentation and retrieval system, as disclosed herein.

According to an example implementation, an author may use an authoring platform to design a dossier and/or one or more dossier-specific information window blueprints, based on data points that are displayed to one or more users. The dossier-specific information window blueprints may be visually provided over a dossier and presented to a user, as further discussed herein. In some embodiments, the author may be a human and/or a machine learning model. The dossier-specific information window blueprints (hereinafter referred to as "blueprints") may be stored at a dossier-specific storage system. The blueprints may be accessed from the dossier-specific storage system by a dossier, depending user inputs received at the dossier. For example, the user may hover over a particular area on the dossier for a certain amount of time, which may instruct the dossier to retrieve from the dossier-specific storage a particular blueprint.

In some embodiments, a user may input contextual data points, e.g., clicking on a particular area of the dossier, hovering a cursor over an area, gazing at a portion of a dossier, etc., which may signal the dossier to retrieve a particular blueprint from the dossier-specific storage, as discussed above, and/or data from one or more databases. The data stored in the databases may include any applicable data (e.g., associated with an entity, an organization, a group, a topic, etc.) and may include, for example, sales data, inventory, customer reviews, or any other data that may be relevant to a user or author. The specific data received by the dossier may be determined by contextual data point(s) input by a user viewing a dossier and a blueprint. For example, if the contextual data point(s) indicate a request for sales data of a particular item and the blueprint indicates the data for a given year, the dossier platform may request that particular data from one or more datasets. Once the data is received at the dossier platform from the one or more databases, the dossier platform may display the data via a graphical user interface ("GUI"), e.g., via a dossier-specific information window, that may be overlaid over at least a portion of a dossier. The way the data may be displayed via the GUI may depend on a selected blueprint. The type of data that may be displayed via the GUI may depend on the contextual data point(s) identified based on user input and/or the blueprint. In some embodiments, the data, blueprints, and/or other information may be transmitted via a network or any other suitable means.

In some embodiments, a machine learning model may be used to generate the blueprint. The blueprint outputted by the machine learning model may be based on at least one of dossier content, a contextual data point, historical dossier-specific information windows, and/or other historical data, e.g., user history. Dossier content may comprise any content input by the author or by the user. For example, dossier may comprise graphs shown in response to a user's inputted request for data.

Historical information such as historical data, historical dossier-specific information windows, and/or contextual information inputted by the user, e.g., hovering the mouse over a particular area of the dossier, may be used to train the machine learning model to output particular blueprints. Training data and outcome data may be received by the machine learning model. The machine learning model may adjust at least one of weights, biases, or layers of a training model based on the training data and the outcome data. Based on the training model, a trained machine learning model may be output. For example, the machine learning model may receive inputs that indicate that users frequently access a subset of the dossier to request information related to sales per month. The machine learning model may be trained such that if a subsequent user hovers her mouse over the same or similar area in a dossier, the output blueprint includes information on past sales that month and projected sales for the next month, via a dossier-specific information window, as further discussed herein.

In some embodiments, the association between the data (e.g., data stored in the database) and any information relevant to the blueprints (e.g., remaining inventory of a particular products) may be predetermined, e.g., generated manually such as via one or more criteria. In some embodiments, such association may be at least partially learned via a machine learning process. For example, contextual data points (e.g., a user clicking on a particular area of the dossier) and blueprints (e.g., those that indicate display of certain data, graphs, percentages, etc.) may be used as training data to train a machine learning model, such that the trained model is configured to output one or more blueprints in response to input of one or more contextual data points. In an exemplary embodiment, a machine learning model may be initialized based on predetermined associations, and may thereafter be tuned or modified based on further data. In some embodiments, the training data may include contextual data points and/or historical user data.

In some embodiments, a sequence of data (e.g., contextual data points) and/or a sequence of analyses resulting from such data may be used to train a machine learning model and/or determine information regarding a user. For example, successive contextual data points over time may be used to compare a blueprint to a baseline for the user, or to track, identify, or predict changes over time.

While several of the examples above involve generating contextualized data points related to existing data, it should be understood that techniques according to this disclosure may be adapted to predict future data (e.g., trends, forecasts, etc.). Such future data may be generated based on data accessed from a database (e.g., by a prediction model). It should also be understood that the examples above are illustrative only. The techniques and technologies of this disclosure may be adapted to any suitable activity.

Disclosed below are various systems and methods of generating contextualized data via dossier-specific information windows using data manipulation and, in some embodiments, machine learning techniques.

FIG. 1 depicts an exemplary environment 100 that may be utilized with techniques presented herein. An authoring platform 105, a user input 110, a dossier platform 120, a database 130, a dossier-specific storage 140, and a GUI 150 may communicate via a network 125 or any other suitable means. Authoring platform 105 may be used by an author, e.g., a computer programmer, to generate various blueprints (e.g., for dossiers or dossier-specific information windows). The authoring platform 105 may generate blueprints based on selecting one or more layouts or placeholders from a library of layouts or placeholders. Alternatively, or in addition, authoring platform 105 may generate templates for one or more blueprints, where the templates may include layouts or placeholders in a given arrangement (e.g., location, shape, orientation, etc.). For example, a blueprint for a gym equipment company may comprise different charts customizable to each category, such as line graphs for treadmills and bar graphs for rowing machines. The blueprint may be generated by selecting a first template of a plurality of templates at the authoring platform 105, and then modifying one or more components (e.g., placeholders) of the template to create the blueprint. Authoring platform 105 may generate dossier-specific information window blueprints by selecting a subset of a plurality of information window components, e.g., different graphs, charts, or maps. In some embodiments, authoring platform 105 may comprise a machine learning model. This machine learning model may use various machine learning techniques to generate blueprints based on user input 110 and/or contextual data, as discussed herein.

Dossier-specific storage 140 may act as a repository for blueprints accessible by the dossier platform 120. Dossier-specific storage 140 may be a single component or may include multiple servers, memories, databases, etc. Dossier-specific storage 140 may transmit blueprints to dossier platform 120 and/or dossier platform 120 may request blueprints from dossier-specific storage 140. Different dossier-specific information windows may be selected based on the particular user input 110 and/or contextual data, discussed in more detail below.

Dossier platform 120 may receive user input 110 and provide a dossier (e.g., a document, a webpage, an application, a software, etc.) to GUI 150. Dossier platform 120 may receive user input 110 (e.g., over network 125). User input 110 may be collected while providing a dossier to a user (e.g., at GUI 150) and may be in any relevant form, such as a cursor hovering for a given amount of time, the cursor clicking on a particular area, a gaze detection, a haptic input, a touch input, or any other suitable signal, trigger, or other input. For example, user input 110 may comprise a cursor hovering over a subset area of a dossier for a threshold number of seconds.

Different forms of user input 110 may signal different requests from dossier platform 120. For example, if a user hovers over a particular area of the dossier, that user input 110 may request a particular blueprint from dossier-specific storage 140 and particular data from database 130 to populate the dossier. However, if a user clicks on that same area of the dossier, that user input 110 may request the same or different blueprint from dossier-specific storage 140 and the same or different data from database 130. Additionally, if a user clicks, hovers, etc. in a different area of the dossier, that user input 110 may request a different blueprint and different data.

A user input 110 may be used to signal different requests within the dossier. The author may customize the dossier to respond to different forms or locations of user inputs 110 in different ways. For example, a user input 110 may be in the form of click on the dossier outside the border of dossier-specific information window, which may signal for the dossier-specific information window to close to display the dossier. In another example, the author may customize the dossier-specific information window to display a close button on the dossier-specific information window that, when clicked, may close the dossier-specific information window to display the dossier.

The author may customize the dossier in any preferred way so that different user inputs 110 signal different requests from the dossier-specific storage 140 and/or the database 130. The author may customize the dossier blueprints to show different data in response to particular user inputs 110. For example, Author A may customize a click over an area of the dossier to show sales of an item in the last year, while Author B may customize a click over the same dossier area to show sales of the item in a geographic area. The author may customize the dossier to show subsets of data to particular users based on the user's physical location or any other relevant measure. For example, the author may customize the dossier blueprints to show an Oregon-based user movie sales for the northwest United States while showing a Florida-based user movie sales for the southeast United States. Alternatively, or in addition, a dossier specific information window may include different information based on different users triggering the dossier specific information window. For example, a first user may access a dossier and trigger a dossier specific information window by selecting a first component from the dossier. The dossier specific information window triggered based on the first user selecting the first component may show Northeast sales of the component. A second user may access the same dossier and trigger a dossier specific information window by selecting the first component from the dossier. The dossier specific information window triggered based on the second user selecting the first component may show Southern sales of the component. Accordingly, the information provided in a dossier specific information window may be based on the user triggering the window. The user, a user profile, or user preferences may be one or more contextual data points.

Contextual data may be collected based on user input 110. Contextual data may be anything that clarifies or provides more information for the user input, such as form, placement, frequency, duration, time, category, data changes, historical data, and/or any other measure of the author's choosing. As discussed above, contextual information can be based on the form of user input 110, e.g., a user clicking versus hovering on an area of the dossier. Additionally, or alternatively, contextual data may be based on the placement, location, or proximity of one or more user inputs 110, such as based on items displayed on a dossier proximate to the user input 110. For example, if user input 110 occurs at a location on the dossier denoting a particular category, e.g., barbell sales, other related data may be included, e.g., dumbbell sales, while other unrelated data is excluded, e.g., yoga mat sales.

Contextual data may be based on any relevant time measure, such as time, input frequency, input duration, or. For example, a first user input 110 requesting information on treadmill sales may signal the dossier to display treadmill sales for the prior year. If a second user input 110 occurs a few seconds after the first, the dossier may then request display of treadmill sales from the six months prior. If a third user input 110 occurs a few seconds after the second, the dossier may be requested to display treadmill sales within the last month. The author may customize the dossier blueprint to display certain data when provided with a series of user inputs 110 in a particular interval.

Similarly, contextual data may be based on duration. User input 110 that occurs for a certain duration may signal the dossier to display particular data points. For example, if user input 110 for treadmill sales is continuous (e.g., in the form of clicking) for one to three seconds, the dossier may be signaled to display treadmill sales within the United States for the last year. However, if user input 110 for treadmill sales is continuous (e.g., in the form of clicking) for four to six seconds, the dossier may be signaled to alternatively display treadmill sales within Canada for the last year.

Contextual data may be collected based on categorical user inputs 110. Categories within the dossier may be customized by the author. For example, a gym equipment company may create categories for barbells, dumbbells treadmills, etc. For example, if the user input 110 is for a given category, one or more other categories or related attributes proximate to the given category may be included as a contextual data point. For example, if a given category is a certain type of equipment, a contextual data point may be a time period marker from a plurality of time period markers that is closest to the user's cursor.

Contextual data may be collected based on historical user inputs 110. After receiving prior data (e.g., based on user input 110 at a first time), the dossier may predict data that the user may request at a later time (e.g., a second time) or that the user may benefit from based on the user input at the first time. The dossier may use machine learning to determine what data to display, discussed in more detail below. For example, a first user input 110 may request information on sales of barbells in a particular year. A second user input 110 may request information on sales of barbells in an earlier year.

In response to these historical user inputs 110, the dossier may display information based on additional or predicted information (e.g., data for sales of barbells for ten years prior). Any form or combination of historical inputs may be used to display different information.

Contextual data may be collected based on changes in data corresponding to the requested data. For example, a first user input 110 may request data on the user's remaining stock of treadmills. If the amount of stock changes, a second user input 110 requesting stock information may result in different data displayed on the dossier.

Different forms of user input 110 may signal different types of information. For example, hovering a cursor over an area of the dossier may signal for dossier platform 120 to retrieve a single data point from database 130, but clicking on the same area may signal for dossier platform 120 to retrieve numerous data points from database 130. Database 130 may initiate transmission of data to dossier platform 120 and/or dossier platform 120 may initiate transmission of data from database 130.

Dossier platform 120 may communicate the data from database 130 and/or the blueprint from dossier-specific storage 140 to GUI 150. GUI 150 may display the data from the database 130 on a dossier-specific information window, which may be based on the blueprint retrieved from dossier-specific storage 140. The data may be used to populate a dossier-specific information window based on the blueprint generated at authoring platform 120. In some embodiments, the dossier-specific information window may be provided directly over the dossier. In some embodiments, such as those where the device displaying GUI 150 uses a mobile operating system (e.g., iOS), the dossier-specific information window may move from a first location to a second location of GUI 150. For example, based on a user scrolling using a mobile device, a dossier-specific information move from a first location on the mobile device (e.g., a GUI presented on the mobile device) to a second location.

The components of environment 100 may communicate via network 125. Network 125 may be any suitable network or combination of networks and may support any appropriate protocol suitable for the communication of data between various components in environment 100. Network 125 may include a public network (e.g., the Internet), a private network (e.g., a network within an organization), or a combination of public and/or private networks. Dossier platform 120 and/or one or more components of environment 100 may be implemented using multiple computers that cooperate to perform the functions discussed below, which may be located remotely from each other.

Environment 100 may include one or more computer systems configured to gather, process, transmit, and/or receive data. In general, whenever environment 100 or components thereof is described as performing an operation of gathering, processing, transmitting, or receiving data, it is understood that such operation may be performed by a computer system thereof.

Although depicted as separate components in FIG. 1, it should be understood that a component or portion of a component in environment 100 may, in some embodiments, be integrated with or incorporated into one or more other components. For example, all or a portion of dossier-specific storage 140 may be integrated into database 130 or the like. In some embodiments, operations or aspects of one or more of the components discussed above may be distributed amongst one or more other components. Any suitable arrangement and/or integration of the various systems and devices of environment 100 may be used.

Figure 2:
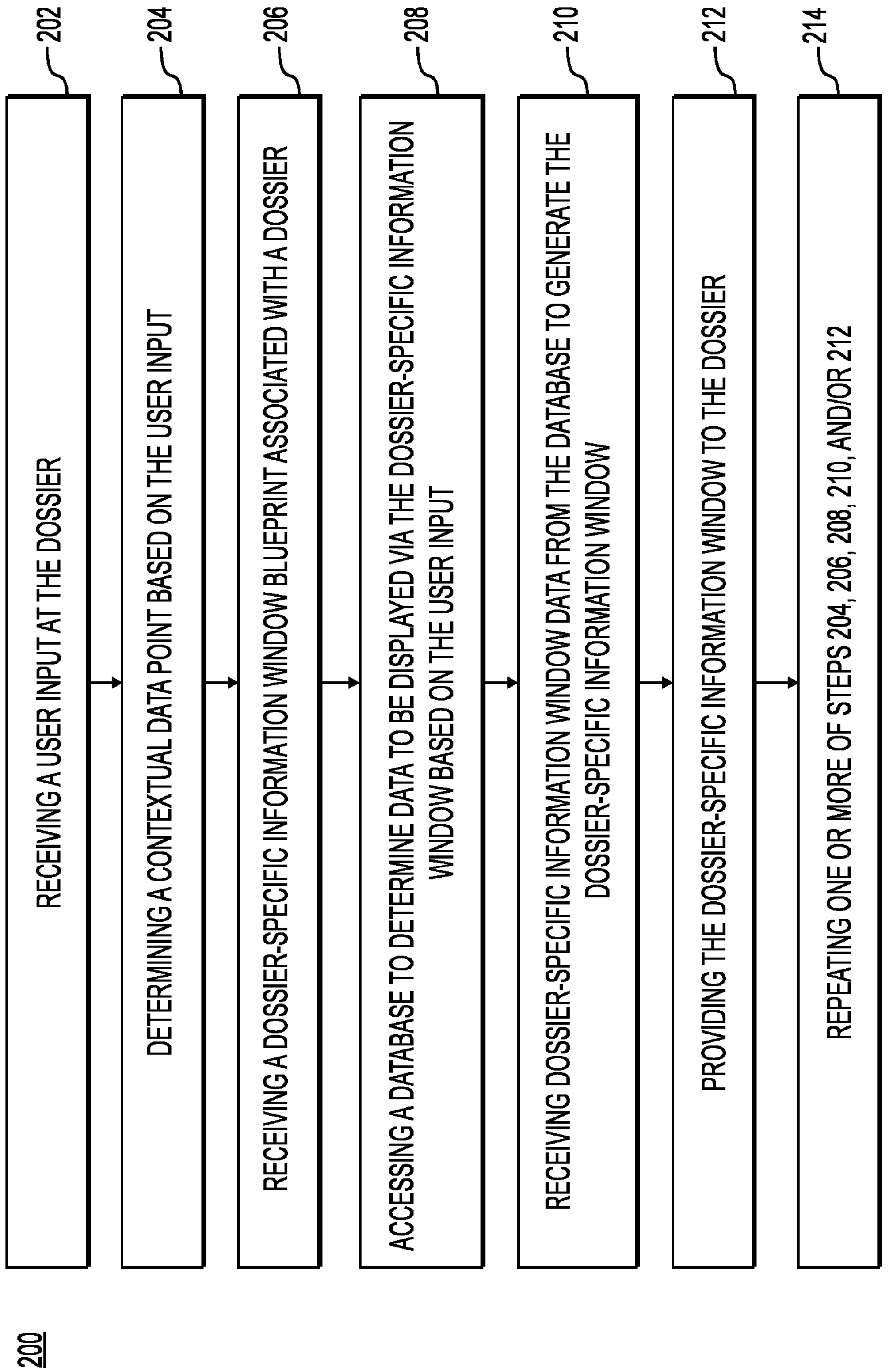
FIG. 2 depicts a flow chart of an exemplary method for generating dossier-specific information windows, according to one or more embodiments.

FIG. 2 illustrates an exemplary process for dynamically displaying contextualized data via a dossier-specific information window, according to one or more embodiments. At step 202, user input 110 may be received at dossier platform 120. As discussed above, the user input may be in any suitable form, such as hovering, highlighting, selecting, etc., as disclosed herein. User input 110 may produce different results, even if in the same form, if received at different areas of dossier platform 120 or at different times. For example, user input 110 inputted at one area of dossier platform 120 may produce a different result than user input 110 inputted at another area of dossier platform 120. The different results may be retrieving one of a plurality of blueprints, based on user input 110.

At step 204, one or more contextual data points may be determined based on user input 110. A contextual data point may be anything that clarifies or provides more information for the user input. Contextual data may be based on user input, may be a time based contextual data, may be a duration based contextual data, and/or may be a category based contextual data. For example, if user input 110 is in the form of a click at a title within dossier platform 120, that input may be associated with a request for numerous forms of data. In another example, if user input 110 is in the form of hovering over a title within dossier platform 120, that input may be associated with a request for a single form of data. Any combination of user inputs 110 may be used to request one or more data points.

At step 206, a blueprint from the plurality of blueprints may be received at dossier platform 120. Authoring platform 105 may be used to generate a plurality of blueprints. As disclosed herein, the plurality of blueprints may be stored in, for example, dossier-specific storage 140. The blueprint may be generated at authoring platform 105 by an author, such as a computer programmer, computer engineer, employee, or other suitable person, or by a machine learning process, as discussed above. Communication of the blueprint to the dossier platform 120 may be initiated by the dossier platform 120, the dossier-specific storage 140, or both. Transmission of the blueprint may occur in response to dossier platform 120 receiving user input 110 at step 202 and/or contextual data determined at 204, as further discussed herein. The blueprint may be selected from a plurality of available blueprints based on the user input and the one or more contextual data points. For example, the blueprint may be selected based on a given item identified via the user input and one or more contextual data points related to the user input and/or the given item.

In some embodiments, blueprints may be generated at authoring platform 105 via a machine learning model. The machine learning model may generate machine learning data (e.g., blueprints containing a layout with placeholder spaces for certain data types based on learned associations between user inputs and data). In some embodiments, machine learning model may be a previously trained model. Training of the machine learning model is discussed in further detail below.

According to some aspects, the machine learning model may receive user input 110 as an input and may correlate user input 110 with data from database 130 to generate a machine learning output, e.g., one or more blueprints. The machine learning output may include correlated data for each of user input 110 and data from database 130. For example, historically, users may elect to see more information about details of sales of certain gym equipment categories presented via a dossier. In this case, historical user inputs may be in the form of initiating a search for additional sales data relating to resistance exercise bands. The machine learning model may correlate the historical user inputs with all data associated with resistance exercise bands to identify the most retrieved type of additional sales data (e.g., sales data for a given month). The historical user inputs may be used by the machine learning model to generate or update a corresponding blueprint, such as to only show sales of resistance exercise bands in a given month but not in the previous year.

In some embodiments, the machine learning model may perform one or more machine learning operations on the data. As discussed above, any suitable machine learning technique or combination of techniques, e.g., CNN or RNN, may be used. For example, in some embodiments, the machine learning model may use a CNN to interpret a given user input 110 and generate a blueprint to display contextualized data. The output from the machine learning model, e.g., blueprints, may be communicated to dossier-specific storage 140, dossier platform 120, and/or any other suitable recipient or aspect of environment 100.

At step 208, dossier platform 120 may access database 130 to determine what data may be displayed via GUI 150, e.g., via the dossier-specific information window. In some embodiments, database 130 may initiate transmission of data to dossier platform 120. The data to be displayed may be based on the blueprint, the contextual data, and/or data available at database 130.

At step 210, dossier platform 120 may receive data from database 130, such as dossier-specific information window data. The data may be based on the user input, the contextual data points, and/or available data at the database 130. Dossier-specific information window data may be any data that is called for in a selected blueprint, is based on the user input, and/or the contextual data. The blueprint may include placeholders that are filled in based on data received from database 130. For example, for a user interested in gym equipment sales (e.g., as indicated by user input 110), dossier-specific information window data related to corresponding sales numbers, inventory numbers, employee salaries, and/or any other relevant data point may be received from database 130, based on the placeholders of a blueprint selected at step 206.

At step 212, the data obtained from database 130 may be displayed at the dossier-specific information window displayed via GUI 150. The dossier-specific information window may occupy a subset of the dossier area such that some portion of the dossier may be visible in addition to the dossier-specific information window. In some embodiments, the whole of the dossier may be covered by the dossier-specific information window. In some embodiments, the dossier-specific information window may be semi-transparent or semi-opaque such that the data displayed on the dossier as well as the data displayed on the dossier-specific information window may both be visible.

At step 214, one or more steps of environment 200 may be repeated. For example, if a user provides a first user input 110, GUI 150 may display a first dossier-specific information window populated with a first set of data from database 130. If a user provides a second user input 110, GUI 150 may display a second dossier-specific information window populated with a second set of data from database 130. Repeating these steps may keep the user informed about changes in various data points. The steps may be repeated as necessary to generate contextualized data points in a dossier-specific information window. According to an embodiment, a first dossier-specific information window may be hidden based on an updated user input 110 and/or a second dossier-specific information window may be displayed based on the updated user input 110.

Figure 3A:
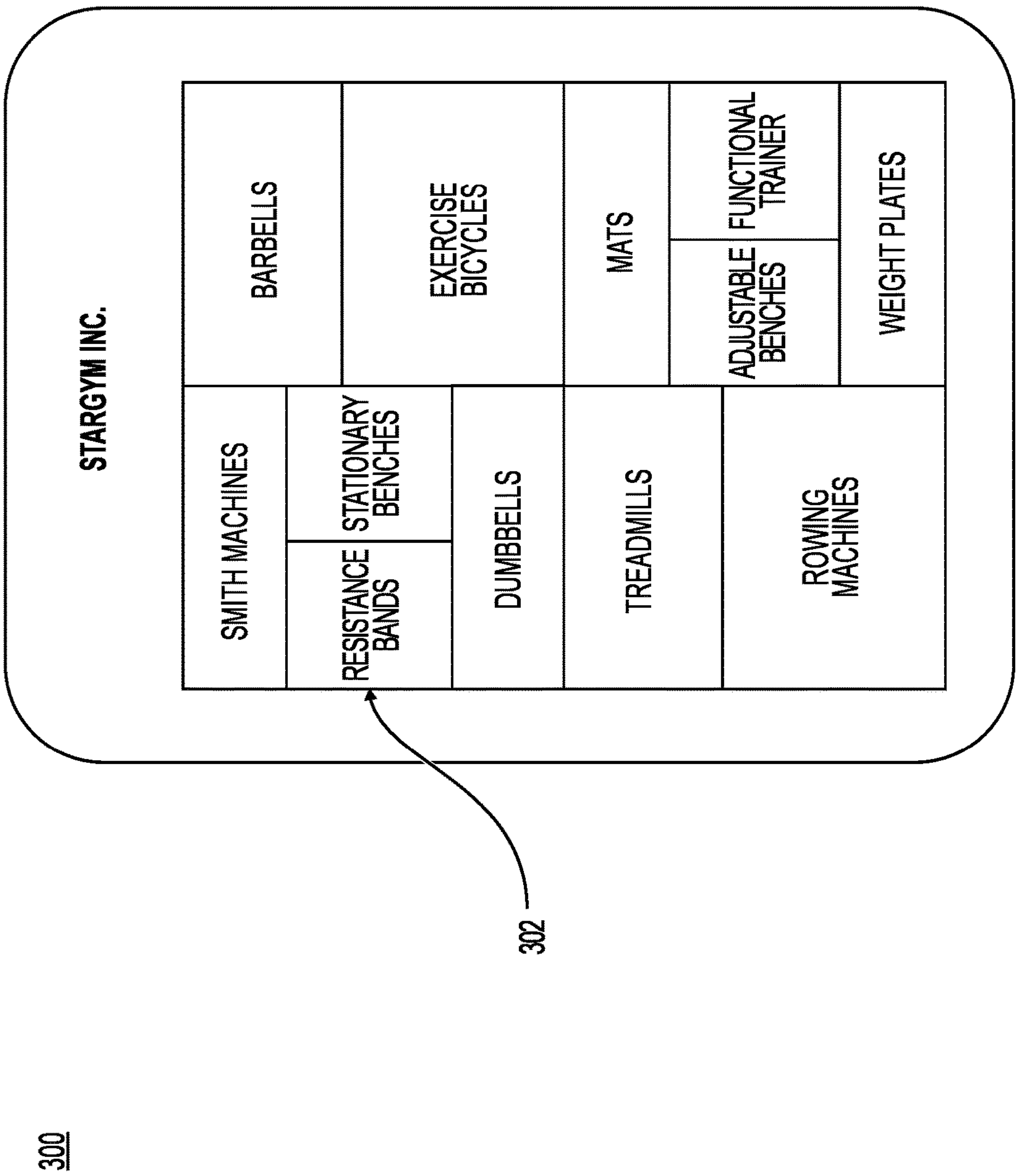
FIG. 3A depicts an exemplary dossier, according to one or more embodiments.

FIG. 3A depicts an exemplary dossier 300, according to one or more embodiments. In some embodiments, dossier 300 may show various graphs, charts, or maps, such as a heat map. Dossier 300 may have various different areas for user input 110. Dossier 300 may be generated by authoring platform 105, as discussed above. Dossier 300 may be personalized by the author, the user, or any relevant party. For example, for a company that sells gymnasium equipment, dossier 300 may be customized by the author to show the different equipment, e.g., dumbbells, mats, etc. In some embodiments, dossier 300 may be customized to display different categories 302, such as resistance bands, treadmills, and dumbbells for a gymnasium equipment company.

Figure 3B:
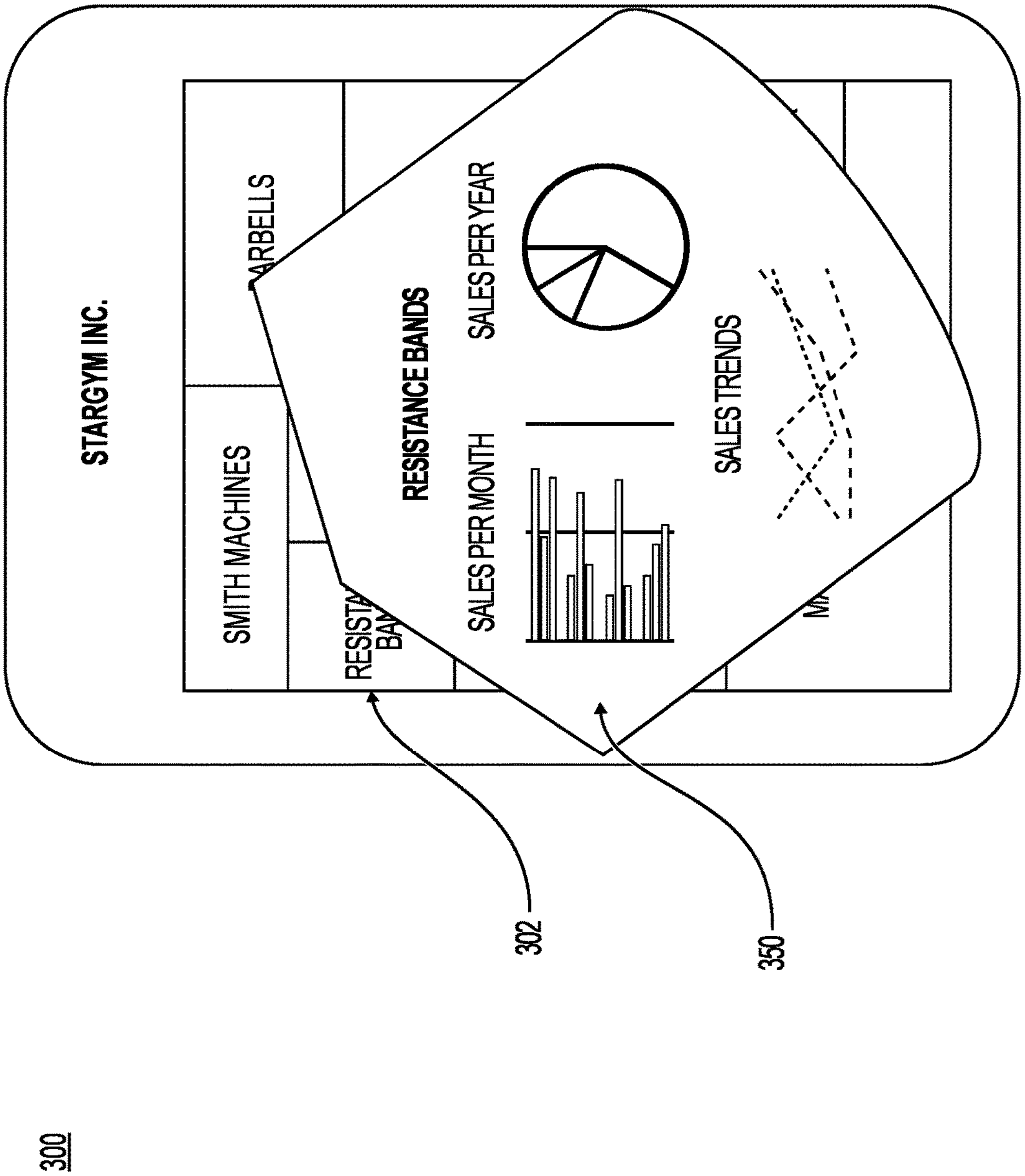
FIG. 3B depicts an exemplary dossier with a dossier-specific information window, according to one or more embodiments.

FIG. 3B depicts an exemplary dossier-specific information window 350, according to one or more embodiments.

Dossier-specific information window 350 may be based on a blueprint generated by an author via authoring platform 105. Dossier-specific information window 350 may be customized, e.g., to have various graphs, charts, or other forms of data displays with pre-determined sizes or dimensions. For example, dossier-specific information window 350 may display sales per month, sales per year, and sales trends when one area of dossier 300, such as categories 302, is identified via user input 110. The data used to display such information may be determined based on the selected blueprint, and may be retrieved from database 130, as disclosed herein. In another example, dossier-specific information window 350 may display different data (e.g., remaining inventory of a given category) when another area of dossier 300 is selected. As discussed above, the dossier-specific information window may occupy the whole or a subset of the dossier area. For example, dossier-specific information window 350 may be overlaid over contextually relevant portions of dossier 300, such that the contextually relevant portions of the dossier are visible in addition to dossier-specific information window 350. In another example, dossier-specific information window 350 may occupy the whole of dossier 300, such that dossier 300 is not visible. Dossier-specific information window 350 may be semi-transparent or semi-opaque. A semi-transparent or semi-opaque dossier-specific information window 350 may include indications (e.g., pointers) to one or more categories displayed in a dossier and that are visible through the semi-transparent or semi-opaque dossier-specific information window 350. Alternatively or in addition, a semi-transparent or semi-opaque dossier-specific information window 350 may display data proximate to one or more categories to which the data corresponds to.

A given dossier-specific information window 350 may be based on a selected blueprint such that a different dossier-specific information window 350 for different user inputs/contextual data points may display different data. Alternatively, or in addition, the dossier-specific information window 350 based on a given user input and/or contextual data point may display different data at different times. For example, a first click on a particular area of dossier 300 may display the sales per month as of the time of the first click. A second click on the same area of dossier 300 may display the sales per month as of the time of the second click. The change in the data displayed via a dossier-specific information window 350 based on the same user input may be based on change in contextual data and/or change in the data itself (e.g., based on updated data from database 130). The data displayed by dossier-specific information window 350 after the first click may be the same or different as the data displayed by dossier-specific information window 350 after the second click.

Figure 3C:
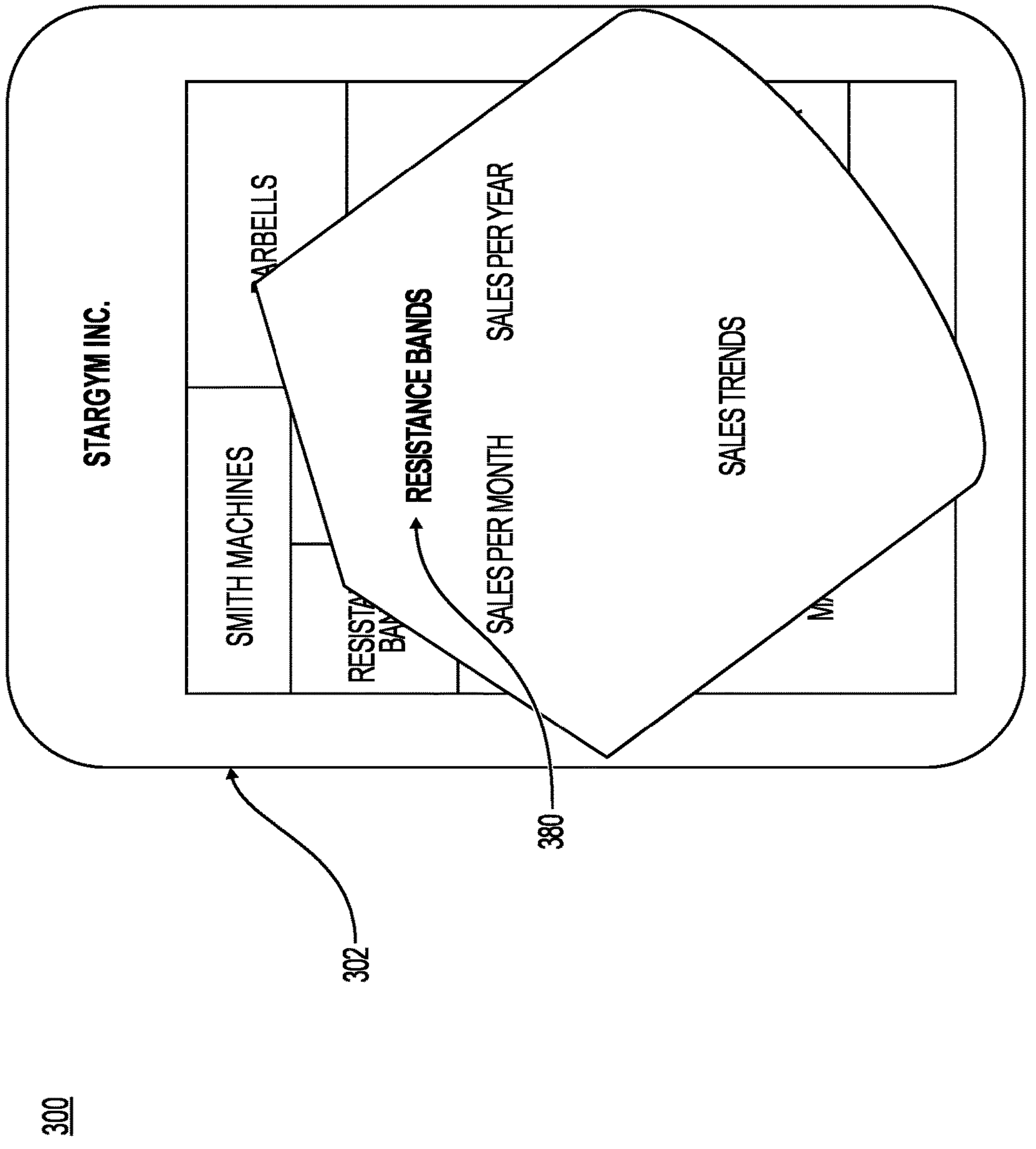
FIG. 3C depicts an exemplary dossier-specific information window blueprint, according to one or more embodiments.

FIG. 3C depicts an exemplary blueprint 380, according to one or more embodiments. Blueprint 380 may be selected form a plurality of blueprints based on a user input, contextual data points, and/or available data. Blueprint 380 may comprise a layout for one or more dossier-specific information windows 350 displayed via dossier 300. Blueprint 380 can be customized via the authoring platform 105 to display various information and may include placeholders to be filled at a time of execution, based on data from database 130. For example, blueprint 380 may be customized to present data on sales per month. The sales per month may change based on, for example, a time based contextual data point that shows first data at a first time, and updated second data at a second time. A different blueprint may include different placeholders (e.g., inventory volumes). The different blueprint may be selected over blueprint 380 based on user input, contextual data points, and/or available data. Blueprint 380 may allow for as much or as little data to be displayed, based on user and/or author preference. It will be understood that blueprint 380 is shown as an explanation only, and a user viewing dossier 300 may not see blueprint 380 (e.g., the user may see dossier-specific information window 350 with data, instead of blueprint 380 without the data).

Figure 4:
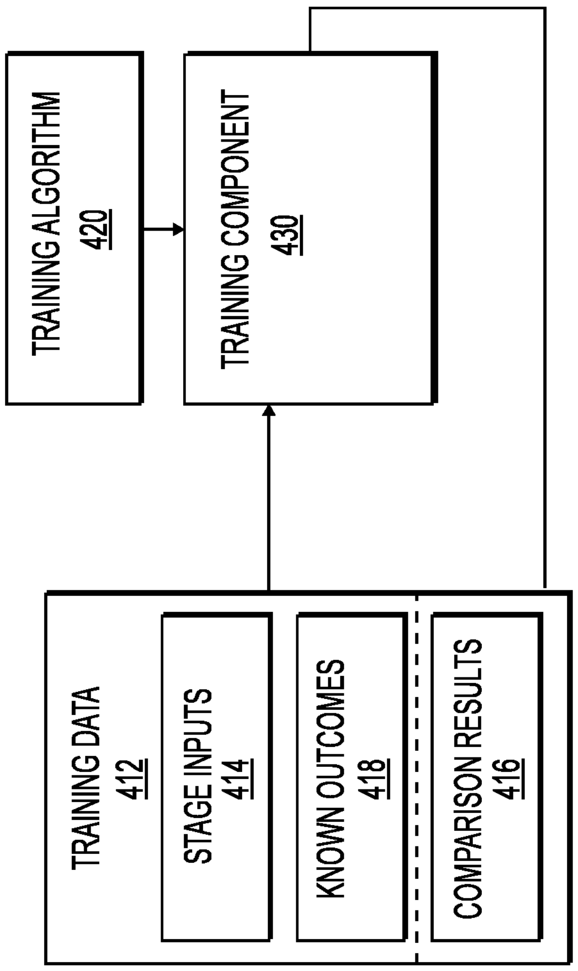
FIG. 4 depicts an example of training a machine learning model, according to one or more embodiments.

FIG. 4 depicts a flow diagram for training a machine learning model to implement generating contextualized data, according to one or more embodiments. One or more of training data 412, stage inputs 414, known outcomes, 418, comparison results 416, a training algorithm 420, and a training component 430 may communicate by any suitable means. One or more implementations disclosed herein may be applied by using a machine learning model. A machine learning model as disclosed herein may be trained using environment 100 of FIG. 1, environment 200 of FIG. 2, environment 300 of FIG. 3A, environment 350 of FIG. 3B, and/or environment 380 of FIG. 3C. As shown in flow diagram 410 of FIG. 4, training data 412 may include one or more of stage inputs 414 and known outcomes 418 related to a machine learning model to be trained. The stage inputs 414 may be from any applicable source including a component or set shown in FIGS. 1, 2, 3A, 3B, and/or 3C. Known outcomes 418 may be included for machine learning models generated based on supervised or semi-supervised training. An unsupervised machine learning model might not be trained using known outcomes 418. Known outcomes 418 may include known or desired outputs for future inputs similar to or in the same category as stage inputs 414 that do not have corresponding known outputs.

Training data 412 and a training algorithm 420 may be provided to a training component 430 that may apply training data 412 to training algorithm 420 to generate a trained machine learning model. According to an implementation, training component 430 may be provided comparison results 416 that compare a previous output of the corresponding machine learning model to apply the previous result to re-train a machine learning model. Comparison results 416 may be used by training component 430 to update the corresponding machine learning model. Training algorithm 420 may utilize machine learning networks and/or models including, but not limited to a deep learning network such as Deep Neural Networks ("DNN"), Convolutional Neural Networks ("CNN"), Fully Convolutional Networks ("FCN") and Recurrent Neural Networks ("RCN"), probabilistic models such as Bayesian Networks and Graphical Models, and/or discriminative models such as Decision Forests and maximum margin methods, or the like. The output of the flow diagram 410 may be a trained machine learning model.

It should be understood that embodiments in this disclosure are exemplary only, and that other embodiments may include various combinations of features from other embodiments, as well as additional or fewer features. For example, while some of the embodiments above pertain to implementing an automated outreach, any suitable activity may be used. In an exemplary embodiment, instead of or in addition to automated outreach to a patient, implementing a targeted medical outreach may include providing input to a medical provider's GUI.

In general, any process or operation discussed in this disclosure that is understood to be computer-implementable, such as the processes illustrated in FIGS. 2 and 4, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit ("CPU"), a graphics processing unit ("GPU"), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 5:
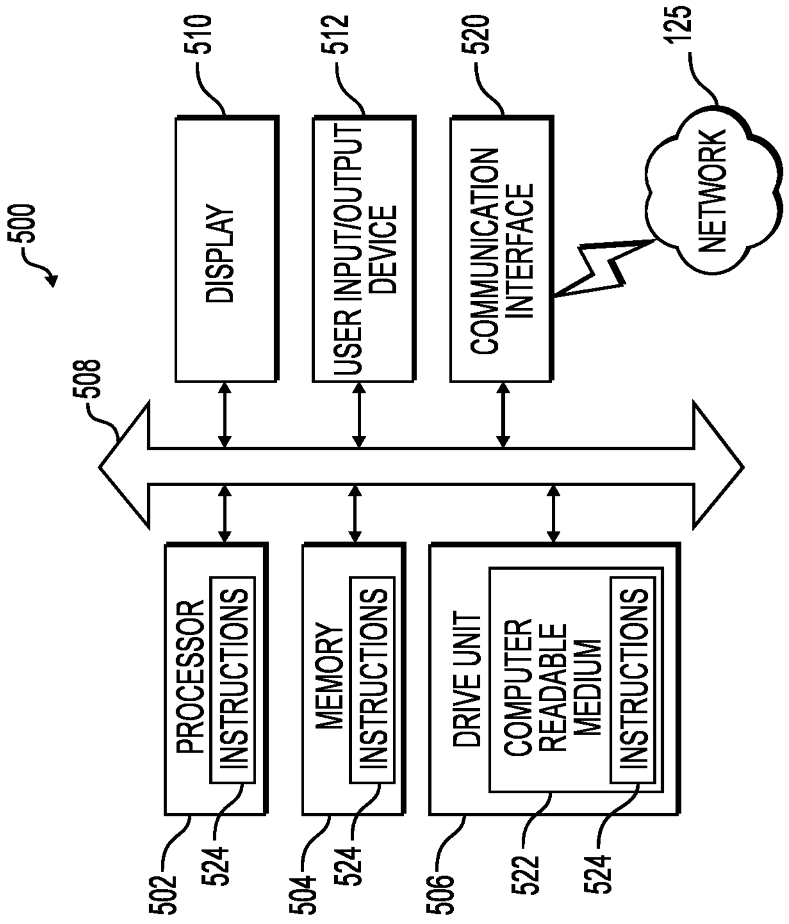
FIG. 5 depicts an example of a computing device, according to one or more embodiments.

FIG. 5 is a simplified functional block diagram of a computer 500 that may be configured as a device for executing the method of FIG. 2, according to exemplary embodiments of the present disclosure. One or more of a processor 502, a memory 504, a drive unit 506, an internal communication bus 508, a display 510, a under input/output ports 512, a communication interface 520, a computer readable medium 522, instructions 524, and a network 125 may communicate by any suitable means. For example, computer 500 may be configured as authoring platform 105, dossier platform 120, database 130, dossier-specific storage 140, and/or another system according to exemplary embodiments of this disclosure. In various embodiments, any of the systems herein may be a computer 500 including, for example, data communication interface 520 for packet data communication. Computer 500 also may include a central processing unit ("CPU") 502, in the form of one or more processors, for executing program instructions. Computer 500 may include internal communication bus 508, and storage unit 506 (such as Read-Only Memory ("ROM"), Hard Disk Drive ("HDD"), Solid-State Drive ("SSD"), etc.) that may store data on computer readable medium 522, although computer 500 may receive programming and data via network communications. Computer 500 may also have memory 504 (such as Random-Access Memory ("RAM")) storing instructions 524 for executing techniques presented herein, although instructions 524 may be stored temporarily or permanently within other modules of computer 500 (e.g., processor 502 and/or computer readable medium 522). Computer 500 also may include input and output ports 512 and/or display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for providing dynamic in-context information, the method comprising:

receiving a user input directed at a particular portion of a dossier via a graphical user interface (GUI);

determining a contextual data point based on the user input, the contextual data point being a relative difference between a user input location of the user input and a user prior input location of a prior user input, each of the user input location and the prior user input location being associated with the particular portion of the dossier;

in response to determining the contextual data point, selecting a dossier-specific information window blueprint of a plurality of dossier-specific information window blueprints associated with the particular portion of the dossier by a machine learning model, wherein the dossier-specific information window blueprint of the plurality of dossier-specific information window blueprints is selected from inputting the contextual data point, the relative difference between the user input and the prior user input and historical user data into the machine learning model;

outputting the selected dossier-specific information window blueprint of the plurality of dossier-specific information window blueprints from the machine learning model;

receiving data from a database corresponding to the particular portion of the dossier based on the selected dossier-specific information window blueprint;

generating a dossier-specific information window based on the selected dossier-specific information window blueprint and the received data, wherein the selected dossier-specific information window blueprint is populated using the received data based on the relative difference between the user input location of the user input and the user prior input location of the prior user input associated with the particular portion of the dossier; and displaying the dossier-specific information window comprising the received data via the graphical user interface (GUI), wherein the dossier-specific information window occupies at least a subset area of the dossier.

2. The method of claim 1, wherein the dossier-specific information window is generated via an authoring platform, wherein the dossier-specific information window is semi-transparent and displayed overlaying the particular portion of the dossier associated with the user input, and wherein the dossier-specific information window includes a plurality of indicators located relative to the user input associating the dossier-specific information window to the user input location.

3. The method of claim 2, wherein the dossier-specific information window is generated by selecting a subset of a plurality of information window components at the authoring platform.

4. The method of claim 1, wherein the selected dossier-specific information window blueprint is received from a dossier-specific database.

5. The method of claim 1, wherein the plurality of dossier-specific information window blueprints is selected from one of a plurality of information window blueprint templates.

6. The method of claim 1, wherein the contextual data point is data input by a user interacting with a dossier that provides contextual information to the dossier.

7. The method of claim 1, wherein the machine learning model identifies the selected dossier-specific information window blueprint based on at least one of historical dossier-specific information windows, dossier content, contextual data point, or user history.

8. The method of claim 1, wherein the machine learning model is trained based on historical user inputs for a plurality of dossiers and wherein training the machine learning model further comprises:

receiving training data including the historical user inputs;

receiving outcome data tagged based on the historical user inputs;

adjusting at least one of weights, biases, or layers of a training model based on the training data and the outcome data; and outputting the machine learning model based on the training model.

9. The method of claim 1, wherein the user input is determined based on a focus area of the dossier, the focus area selected using an input device.

10. The method of claim 1, wherein the user input is determined based on a selection made by an input device.

11. The method of claim 1, wherein the contextual data point received at a first time is different than the contextual data point received at a second time.

12. The method of claim 1, wherein the dossier-specific information window is semi-opaque.

13. The method of claim 12, wherein the dossier-specific information window is overlaid over contextually relevant portions of the dossier, such that the contextually relevant portions of the dossier are visible in addition to the dossier-specific information window.

14. A system for providing dynamic context information, the system comprising:

at least one memory storing instructions; and at least one processor executing the instructions to perform a process, the processor configured to:

receive a user input directed at a particular portion of a dossier via a graphical user interface (GUI);

determine a contextual data point based on the user input, the contextual data point being a relative difference between a user input location of the user input and a user prior input location of a prior user input, each of the user input location and the prior user input location being associated the particular portion of the dossier;

in response to determining the contextual data point, select a dossier-specific information window blueprint of a plurality of dossier-specific information window blueprints associated with the particular portion of the dossier by a machine learning model, wherein the dossier-specific information window blueprint of the plurality of dossier-specific information window blueprints is selected from inputting the contextual data point, the relative difference between the user input and the prior user input and historical user data inputted into the machine learning model;

output the dossier-specific information window blueprint of the plurality of dossier-specific information window blueprints from the machine learning model;

receive data from a database corresponding to the particular portion of the dossier based on the selected dossier-specific information window blueprint;

generate a dossier-specific information window based on the selected dossier-specific information window blueprint and the received data, wherein the selected dossier-specific information window blueprint is populated using the received data based on the relative difference between the user input location of the user input and the user prior input location of the prior user input associated with the particular portion of the dossier; and display the dossier-specific information window comprising the received data via the graphical user interface (GUI), wherein the dossier-specific information window occupies at least a subset area of the dossier.

15. The system of claim 14, wherein the information window data accessed at a first time is different than the information window data accessed at a second time.

16. A method for providing dynamic in-context information, the method comprising:

receiving a user input directed at a particular portion of a dossier via a graphical user interface (GUI);

determining a first contextual data point based on the user input, the first contextual data point being a relative difference between a user input location of the user input and a user prior input location of a prior user input, each of the user input location and the prior user input location being associated with the particular portion of the dossier;

in response to determining the first contextual data point, selecting a first dossier-specific information window blueprint of a plurality of dossier-specific information window blueprints associated with the particular portion of the dossier by a machine learning model, wherein the first dossier-specific information window blueprint of the plurality of dossier-specific information window blueprints is selected from inputting the first contextual data point, the relative difference between the user input and the prior user input and historical user data inputted into the machine learning model;

outputting the first dossier-specific information window blueprint of the plurality of dossier-specific information window blueprints from the machine learning model;

receiving first data from a database corresponding to the particular portion of the dossier based on the first dossier-specific information window blueprint;

generating a first dossier-specific information window based on the first dossier-specific information window blueprint and the first data, wherein the first dossier-specific information window blueprint is populated using the received first data based on the relative difference between the user input location of the user input and the user prior input location of the prior user input associated with the particular portion of the dossier;

and displaying the first dossier-specific information window comprising the first data via the graphical user interface ("GUI"), wherein the first dossier-specific information window occupies at least a first subset area of the dossier;

receiving a second user input at the dossier;

determining a second contextual data point based on the second user input, the second contextual data point being a relative difference between a second user input location of the second user input and the user input location of the user input, each of the second user input location and the user input location being associated with the particular portion of the dossier;

receiving second data from the database corresponding to the particular portion of the dossier based on a second dossier-specific information window blueprint of the plurality of dossier-specific information window blueprints;

in response to determining the second contextual data point, generating a second dossier-specific information window based on the second dossier-specific information window blueprint and the second data, wherein the second dossier-specific information window blueprint is populated using the received second data based on the second contextual data point and the relative difference between the second user input location of the second user input and the user input location of the user input, each of the second user input location and the user input location being associated with the particular portion of the dossier; and displaying the second dossier-specific information window comprising the received data via the GUI, wherein the second dossier-specific information window occupies at least a second subset area of the dossier.

17. The method of claim 16, wherein at least one of the first dossier-specific information window blueprint or the second dossier-specific information window blueprint is output by the machine learning model.

18. The method of claim 17, wherein the machine learning model outputs at least one of first the dossier-specific information window blueprint or the second dossier-specific information window blueprint based on at least one of historical dossier-specific information windows, dossier content, contextual data point, or user history.

19. The method of claim 17, wherein the machine learning model is trained based on historical user inputs for a plurality of dossiers and wherein training the machine learning model further comprises:

receiving training data including the historical user inputs;

receiving outcome data tagged based on the historical user inputs;

adjusting at least one of weights, biases, or layers of a training model based on the training data and the outcome data; and outputting the machine learning model based on the trained model.

* * * * *